8423X
G. G. HERMANCE.
WATER WHEEL.
Patented Sept. 30, 1834.
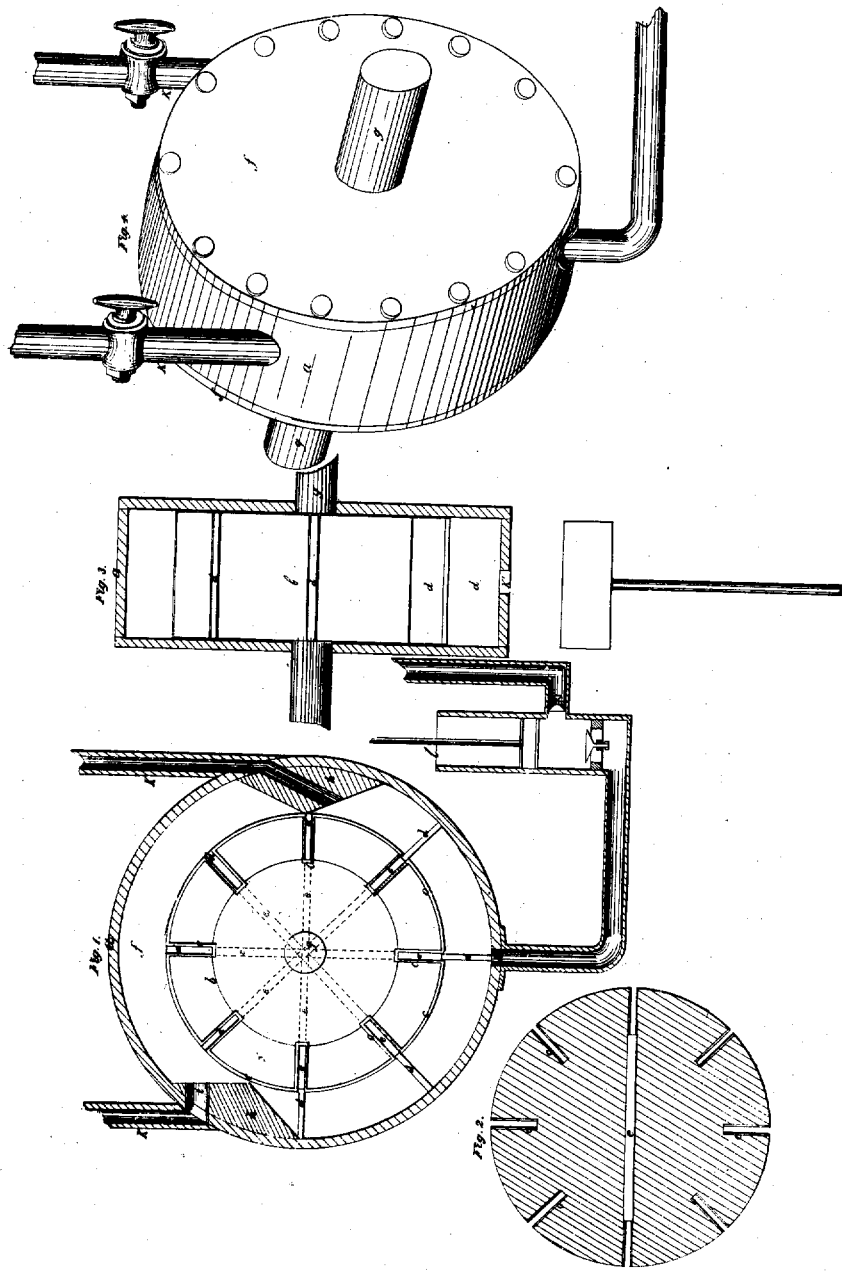
THE NORRIS PETERS CO., PHOTO-LITHO., WASHINGTON, D. C.

Sept. 30. 1834

Garet G. Heermance. County of Green & State of New York

8423X

Letters Patent.

The schedule referred to in these Letters Patent ~~and making~~ part of the same, containing a description in the words of the said Garret G. Heermance, himself of his improvement in the construction of water wheels to turn or propel all kinds of Machinery.

To all to whom these presents shall come.

Be it known that I Garet G. Heermance, of the Town of Coxsackie, in the County of Green, and State of New York, have invented a new and useful improvement in the construction of water wheels for propelling all kinds of machinery, rail road cars, boats or vessels &c. and that the following is a full and exact description of the construction and operation of the said water wheel as invented or improved by me.

The wheel revolves in a hollow cylinder (to be hereafter described) and is made of solid metal, except the open spaces for the sliding valves and packing, having a shaft projecting from each end to any length required; or it may be made with holes to receive the end of the shaft. This wheel must be turned perfectly true, with grooves in the sides for packing. Open spaces are cut into the wheel from the periphery towards the centre, in which slide the valves; they are six or more in number, at equal distances apart, and in a straight line across the centre; they are one fourth of the diameter of the wheel in depth, that is, from the periphery towards the centre; their sides to be perfectly parallel, and smooth so as to offer as little impediment as possible, to the sliding of the valves; the number of the valves must be even, six eight &c.

Holes are bored through the body of the wheel, connecting in direct line, the opposite open spaces, through each of these holes passes

[illegible]

passes around, the object of which is to give Motion to the valves.
The valves are made to slide into the open spaces, above described,
perfectly airtight, of the same width of the wheel, and the length of
the depth of the open spaces, above described, perfectly airtight, their
outer edges to be packed air-tight. The hollow cylinder which sur=
rounds the wheel, is made of cast iron bored out perfectly
true and smooth, of the same width of the wheel, and its inner
diameter one fourth larger. Circular plates of cast Iron turned
perfectly flat, are screwed on the ends of the cylinder with hole
in the centres through which passes the shaft of the wheel. There
are two metallic blocks attached to the inside of the cylinder the
faces of which are straight, and at one point touch the periphery
of the wheel, They are so placed as that, while one valve passes
under one block, the opposite valve passes from under the other,
the object of these is to push in and out, the valves, that is, as the whee
revolves, the valves successively come in contact with the block
which must push them in and out, as the blocks touch the periphery,
the wheel at opposite points, and as there is a rod which passes throug
the wheel from one valve to the other, the opposite valve must be
pushed out so far as to make its end touch the inner surface of
the cylinder, a hole is cut perpendicularly through the cylinder, an
passing also through one of the blocks to admit the water on the va
as the wheel revolves, a perpendicular pipe connects this hole wit
a reservoir of water, when the wheel is made to retrograde or
revolve the other way, a similar hole and pipe is made on the se
of the cylinder passing through the other block. These holes are provi
with a stopcock to shut off the water when required to stop the whee
In the bottom of the cylinder there is a hole to let off the water after i
has operated.

*Operation* — When the wheel is used where there is a sufficien
head of water, the water descends from the reservoir throug
the pipe onto the valves, and by its pressure causes them to
revolve until the valves pass the let off hole, when the wat is discharged. But when the supply of water is small, and it is desired to increase the power of the wheel, the water descends from the reservoir onto the valves of the wheel, as before described, and after it passes from the let off hole into the reservoir it is forced out by a forcing pump, which is worked by the wheel, and at the same time produces a vacuum under the valves. When it is applied to boats or rail road cars, the water is raised into a reservoir by steam or manual power; it then descends thro the perpendicular pipe on the valves as before described, and out through the let off hole into the reservoir, and then forced up into the reservoir above mentioned, at the same time producing a vacuum under the valves.

The dimentions of the wheel and its several parts can be varied according to the power required, and the fancy of the builder, provided the principle be retained.

What I claim as new, and as my invention, and for which I ask letters Patent, is the construction of the described water wheel, the principle of hydrostatic pressure as applied to water wheels, and the producing a vacuum under the valves of the wheel, by forcing pumps, and also the principle of propelling rail road cars, and boats or vessels, by water power.

In testimony that the above is a full and exact description of the construction and operation of my invention I have hereunto subscribed my name this 27th day of September, in the year of our Lord 1834.

Garet I. Hermance

Witnesses
Saml. McClinney
Barnabas Waterman (Exd
[illegible]

12416 [illegible]